W. W. DIXON.
DEVICE FOR EXAMINING THE INTERIOR OF PIPES.
APPLICATION FILED NOV. 21, 1910.
1,035,426.
Patented Aug. 13, 1912.
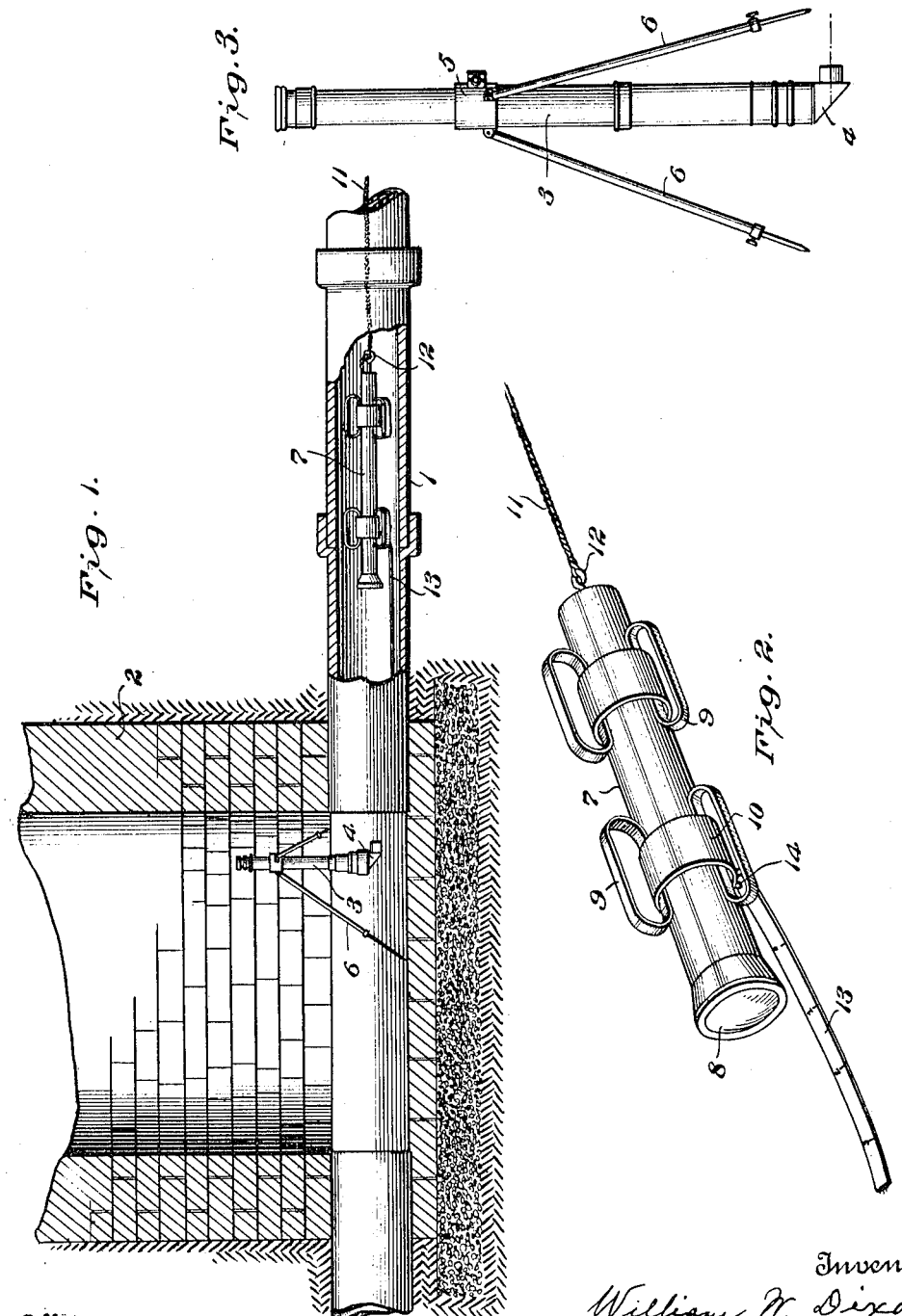

UNITED STATES PATENT OFFICE.

WILLIAM W. DIXON, OF BERNARDSVILLE, NEW JERSEY, ASSIGNOR TO UNION CLAY PRODUCTS COMPANY, OF NEW YORK, N. Y., A CORPORATION OF NEW JERSEY.

DEVICE FOR EXAMINING THE INTERIOR OF PIPES.

1,035,426. Specification of Letters Patent. Patented Aug. 13, 1912.

Application filed November 21, 1910. Serial No. 593,533.

*To all whom it may concern:*

Be it known that I, WILLIAM W. DIXON, a citizen of the United States, and resident of Bernardsville, Somerset county, State of New Jersey, have invented certain new and useful Improvements in Devices for Examining the Interior of Pipes, of which the following is a specification.

This invention relates to a device designed particularly for the purpose of inspecting the interior of small sewer pipes in order to locate breaks, bad joints or branch connections. It is adapted for use wherever it is desired to inspect the interior of small pipes which are not accessible to the operator and the invention is of course not limited to any particular use.

The novel features of the invention will be apparent from the following description taken in connection with the accompanying drawings.

In the drawings, Figure 1 is a longitudinal section of a small sewer having my invention applied thereto; Fig. 2 is an enlarged detail view of my movable lamp and connections; Fig. 3 is an enlarged view of the telescope and support.

In these drawings, 1 represents an ordinary sewer pipe which is too small to be conveniently entered by the operator and 2 represents the well or manhole into which the operator descends in inspecting the sewer. In order to permit the operator in the manhole to conveniently inspect the interior of the pipe 1 I make use of the telescope 3 which is mounted vertically and which has the right angle prism 4 at the lower end for the purpose of directing the line of sight along the horizontal sewer and it is of course to be understood that the telescope is provided with the usual means for focusing it upon an object at different distances. This telescope is held by an adjustable clamp 5 which is supported by tripod legs 6 which are made adjustable. By this supporting means the lower end of the telescope may be brought to the center of the sewer pipe and the line of sight may be directed along it.

In order to light the interior of the sewer so that defective joints, breaks, or branch pipes may be seen through the telescope, I make use of a movable lamp 7 which is preferably made in cylindrical form as shown with the lens 8 at its end. At each end of the lamp I place a series of curved springs 9 which are held in place by clips 10 which extend around the cylindrical lamp body. These springs may be made of steel bands and I preferably use three at each end of the lamp projecting radially therefrom so as to bear against the interior surface of the pipe and furnish a yielding support which holds the lamp practically in the center of the pipe. This yielding support however permits longitudinal movement of the lamp and in order to move it I make use of a drag line 11 which may be made up of two wires secured to the rear end of the lamp at 12 and extending from that point to the interior of the lamp for the purpose of carrying an electric current for operating a lamp. Instead of applying current from outside, however, the lamp may be operated by a storage battery carried within it. To the forward end of the lamp I secure a line 13 which I term a "tag" line since this line has on it graduations or marks by which the distance which it travels may be determined. This line is secured to the lamp at 14 and I preferably form it in the shape of a steel tape having graduations thereon every five inches so that when the lamp 7 is pulled along the sewer by the drag line 11 its distance from the manhole 2 can be determined by examining the tag line within the manhole and thus the exact distance from the manhole of any break or defect in the pipe can be determined. The lamp illuminates the interior of the pipe and the telescope being focused on it and being of sufficient power enables the operator in the manhole to accurately locate breaks.

Having described my invention what I claim and desire to secure by Letters-Patent is, 1. In a device of the class described, the combination with a pipe, of a lamp, spaced from the walls thereof so as to permit a practically unobstructed view past said lamp on all sides, the said lamp being so arranged that its rays will strike the walls on all sides, means for movably supporting said lamp within said pipe, and means for moving said lamp longitudinally of said pipe.

2. In a device of the class described, the combination with a pipe, of a lamp, means for movably supporting said lamp within said pipe, said lamp being so arranged that its rays will strike the walls on all sides, means for moving said lamp longitudinally of said pipe, and means for determining the distance of said lamp from the end of said pipe.

3. The combination with a lamp, of curved springs radiating from said lamp, and cables secured to said lamp and extending in opposite directions one of said cables being graduated.

4. The combination with an elongated lamp, of similarly arranged curved springs radiating from said lamp at opposite ends, and cables secured to said lamp and extending in opposite directions.

5. In a device of the class described, the combination with a lamp, of supporting projections radiating from said lamp and oppositely extending cables secured to said lamp.

6. In a device of the class described, the combination with a tube, of a lamp, means for spacing said lamp from the walls of said tube so as to permit a practically unobstructed view past said lamp on all sides, a lens for said lamp adapted to direct the rays of light so they will strike the walls of the tube on all sides, and means for moving the lamp longitudinally of said tube.

In testimony whereof I affix my signature in presence of two witnesses.

WILLIAM W. DIXON.

Witnesses:
 HUDSON N. MASON,
 E. F. WOODWARD.